(12) United States Patent
Aoki et al.

(10) Patent No.: US 9,160,771 B2
(45) Date of Patent: Oct. 13, 2015

(54) METHOD AND APPARATUS FOR DYNAMIC DESTINATION ADDRESS CONTROL IN A COMPUTER NETWORK

(71) Applicant: International Business Machines Corporation, Armonk, NY (US)

(72) Inventors: Kentaro Aoki, Kanagawa-ken (JP); Yukinobu Moriya, Tokyo (JP); Naoto Shimizu, Kanagawa-ken (JP); Shinichiroh Saitoh, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 13/965,908

(22) Filed: Aug. 13, 2013

(65) Prior Publication Data

US 2013/0332617 A1 Dec. 12, 2013

Related U.S. Application Data

(63) Continuation of application No. 12/790,088, filed on May 28, 2010, now abandoned.

(30) Foreign Application Priority Data

Jul. 22, 2009 (JP) ................................. 2009-171020

(51) Int. Cl.
H04L 29/06 (2006.01)
(52) U.S. Cl.
CPC ............ *H04L 65/1069* (2013.01); *H04L 63/08* (2013.01); *H04L 63/0876* (2013.01); *H04L 63/102* (2013.01)
(58) Field of Classification Search
CPC ... H04L 63/08; H04L 65/1069; H04L 63/102; H04L 63/0876

USPC .............................. 726/3; 709/217, 224, 245
See application file for complete search history.

(56) References Cited

U.S. PATENT DOCUMENTS 6,321,336 B1 11/2001 Applegate et al.
6,654,807 B2 * 11/2003 Farber et al. .................. 709/225
(Continued)

FOREIGN PATENT DOCUMENTS

JP 07-281980 10/1995
JP 11-136274 5/1999
(Continued)

OTHER PUBLICATIONS

H. Kashima, et al., "Marginalized Kernels Between Labeled Graphs," Proceedings of the Twentieth Inter. Conf.on Machine Learning (ICML), Aug. 2003, pp. 321-328, vol. 20, No. 1.
(Continued)

*Primary Examiner* — Harunur Rashid
(74) *Attorney, Agent, or Firm* — John A. Jordan

(57) ABSTRACT

An arrangement to direct a packet sent out from an arbitrary apparatus connected to a network to a predetermined authentication server without changing the configuration of a computer network. A packet transmitted from apparatus, such as a personal computer, newly connected to the network, is guided to an authentication server via communication control apparatus. The communication control apparatus replaces a MAC address of the destination addresses of another server, which is included in the ARP cache of the personal computer, with the MAC address of the communication control apparatus to guide the packet from the personal computer to the communication control apparatus. The communication control apparatus further transmits the received packet to a predetermined authentication server.

25 Claims, 9 Drawing Sheets

(56) References Cited

U.S. PATENT DOCUMENTS

| | | | |
|---|---|---|---|
| 6,874,147 | B1 | 3/2005 | Diamant |
| 6,971,044 | B2 | 11/2005 | Geng et al. |
| 7,093,288 | B1 | 8/2006 | Hydrie et al. |
| 7,124,197 | B2 | 10/2006 | Ocepek et al. |
| 7,174,390 | B2 | 2/2007 | Schulter et al. |
| 7,231,430 | B2 | 6/2007 | Brownell et al. |
| 7,370,273 | B2 | 5/2008 | Beyer et al. |
| 7,448,076 | B2 | 11/2008 | Ocepek et al. |
| 7,474,655 | B2 | 1/2009 | Aoki et al. |
| 7,725,932 | B2 | 5/2010 | Aoki et al. |
| 7,912,846 | B2 | 3/2011 | Kawabe et al. |
| 7,974,984 | B2 | 7/2011 | Reuth |
| 7,996,894 | B1 * | 8/2011 | Chen et al. ............. 726/22 |
| 2003/0048783 | A1 | 3/2003 | Tateoka |
| 2003/0177118 | A1 | 9/2003 | Moon et al. |
| 2004/0054926 | A1 | 3/2004 | Ocepek et al. |
| 2004/0088571 | A1 | 5/2004 | Jerrim et al. |
| 2006/0059552 | A1 * | 3/2006 | Aoki et al. ............. 726/13 |
| 2006/0288015 | A1 | 12/2006 | Schirripa et al. |
| 2007/0061713 | A1 | 3/2007 | Chidlovskii et al. |
| 2008/0084820 | A1 * | 4/2008 | Aoki et al. ............. 370/231 |
| 2009/0007254 | A1 | 1/2009 | Aoki et al. |
| 2012/0109960 | A1 | 5/2012 | Mishina |

FOREIGN PATENT DOCUMENTS

| | | | |
|---|---|---|---|
| JP | 2000003366 | | 1/2000 |
| JP | 2001191743 | | 7/2001 |
| JP | 2002318739 | A | 10/2002 |
| JP | 2003030227 | | 1/2003 |
| JP | 2003273936 | A | 9/2003 |
| JP | 2003289338 | A | 10/2003 |
| JP | 2003348113 | A | 12/2003 |
| JP | 2004118379 | | 4/2004 |
| JP | 2004240231 | | 8/2004 |
| JP | 2005227851 | | 8/2005 |
| JP | 20060168191 | | 6/2006 |
| JP | 2007052556 | | 3/2007 |
| JP | 2007336401 | A | 12/2007 |
| JP | 2008507789 | | 3/2008 |
| JP | 2008084113 | | 4/2008 |
| JP | 2008541223 | | 11/2008 |

OTHER PUBLICATIONS

D. Peterson, et al., "W3C XML Schema Definition Language (XSD) 1.1 Part 2: Datatypes," W3C Candidate Recommendation, Jul. 2011, 159 pages.

T. Bray, et al., "Extensible Markup Language (XML) 1.0 (Fifth Edition)," WC3 Recommendation, Nov. 2008, 47 pages.

S. Gao, et al., "W3C XML Schema Definition Language (XSD) 1.1 Part 1: Structures," W3C Candidate Recommendation, Jul. 2011, 257 pages.

Office Action (mail date May 30, 2008) for U.S. Appl. No. 11/175,756, filed Jul. 6, 2005.

Notice of Allowance and Fee(s) Due (Mail date Sep. 3, 2008) for U.S. Appl. No. 11/175,756, filed Jul. 6, 2005.

Office Action (mail date Jul. 24, 2009) for U.S. Appl. No. 12/205,247, filed Sep. 5, 2008.

Notice of Allowance and Fees(s) Due (Mail date Jan. 12, 2010) for U.S. Appl. No. 12/205,247, filed Sep. 5, 2008.

Cisco NAC (Network Access Control): http://www.cisco.com/web/JP/product/hs/security/cca/index.html.

Trend Micro Network Virus Wall Enforcer: http://jp.trendmicro.com/imperial/md/content/jp/products/enterprisebusinesssolutions/nvw-tm-d002.pdf.

IBM Client security solution: http://www-935.ibm.com/services/jp/index.wss/offering/its/a1009288.

IBM client security solution detail: http://www-935.ibm.com/services/jp/index.wss/detail/its/a1011153?cntxt+a1009288.

Microsoft NAP (Network Access Protection): http://www.microsoft.com/japan/windowsserver2008/technologies/network-access-protection.mspx.

NEC Caps/Suite: http://www.nec.co.jp/cced/capssuite/images/capssuite.pdf.

Solution Net'Attest Security Filter: http://www.soliton.co.jp/support/hardware/netattest_sfps/public/sf_v20x/Net%27AttestSecurityFilterV20_Users Guide_Rev5.pdf.

Office Action (mail date Jun. 6, 2012) for U.S. Appl. No. 12/790,088, filed May 28, 2010.

Jul. 6, 2012 Filed Respnse to Office Action (mail date Jun. 6, 2012) for U.S. Appl. No. 12/790,088, filed May 28, 2010.

Office Action (mail date Sep. 18, 2012) for U.S. Appl. No. 12/790,088, filed May 28, 2010.

Oct. 1, 2012 Filed Response to Office Action (mail date Jun. 6, 2012) for U.S. Appl. No. 12/790,088, filed May 28, 2010.

Office Action (mail date Jan. 11, 2013) for U.S. Appl. No. 12/790,088, filed May 28, 2010.

Jan. 28, 2013 Filed Response to Office Action (mail date Jan. 11, 2013) for U.S. Appl. No. 12/790,088, filed May 28, 2010.

Jan. 28, 2013 Filed Req. for Cont. Exam.(RCE) Trans.to Off. Act. (mail date Jan. 11, 2013) for U.S. Appl. No. 12/790,088, filed May 28, 2010.

Off. Comm. (App.-Intiated Int. Summary), (mail date Feb. 7, 2013) for U.S. Appl. No. 12/790,088, filed May 28, 2010.

Notice of Allowance and Fee(s) Due (mail date Jul. 5, 2013) for U.S. Appl. No. 12/790,088, filed May 28, 2010.

* cited by examiner

METHOD AND APPARATUS FOR DYNAMIC DESTINATION ADDRESS CONTROL IN A COMPUTER NETWORK

The present application is a continuation application of a co-pending U.S. patent application Ser. No. 12/790,088, filed May 28, 2010 and allowed Jul. 5, 2013.

BACKGROUND OF THE INVENTION

1. Field of the Invention

The present invention relates to a method and apparatus for dynamically controlling destinations of packets in a computer network and, in particular, to a method and apparatus for changing an address of a controlled apparatus by giving an instruction to transfer packets to be originally transmitted from the controlled apparatus to a destination apparatus, to another apparatus having a destination address different from the original destination address, for example, via data transferring apparatus.

2. Background and Related Art

A computer network is configured in a manner that the types and the number of devices can be flexibly changed, and this enhances the convenience of information processing for individual users. For example, a user can flexibly achieve work by possessing a portable terminal, such as a portable computer, and appropriately connecting the portable terminal to a network.

However, it is necessary to give consideration so that such flexible operation does not adversely affect the operation, efficiency, security and safety of a network. For example, portable terminals with malicious code that may act to harm the operation, efficiency, security or safety of a network need to be identified and precluded from connection.

Recently, enterprises, such as organization networks, have been implementing general security policies that apply to all activities in the organization. A network security policy may, in particular, be implemented and used for the purpose of preventing occurrence of the network problems identified above.

A network security policy may include, for example, conditions which are implemented by a network administrator and which are to be satisfied by devices connected to the network. Under such a security policy, only devices in conformity with the policy are permitted access to the network.

In order to realize this purpose, a quarantine/authentication system may, for example, be used for excluding devices that do not satisfy a security policy established for an intra-organization network. A quarantine/authentication system typically may use various approaches. For example, one approach is to use a validating function, which is for validating the security policy of each device. Another approach is to use a network control function for restrictions or allowing access to a network.

SUMMARY OF THE PRESENT INVENTION

In accordance with the present invention, network access is controlled by employing a packet guiding unit or a packet redirection unit in an existing network so that, for example, a network operation is carried out to redirect data transmitted from a controlled terminal to a desired address, as for example, the address of an authentication server or any other designated server at a desired time.

The present invention is applicable to a computer network connected at least to a first apparatus (for example, a first server) and a second apparatus (for example, an authentication server or any other designated server). Typically, a third apparatus (for example, a portable computer) is connected to the computer network, and the third apparatus stores at least the address of the first apparatus in a corresponding storage device, and transmits and receives data to and from the first apparatus on the basis of the stored address.

The present invention provides a communication controller connectable to such a computer network. The communication controller includes an address replacement unit and a data transfer unit. When the third apparatus is connected to the computer network, the address replacement unit transmits an instruction to the third apparatus for replacing the address of the first apparatus stored in the storage device corresponding to the third apparatus with the address of the data transfer unit. The third apparatus transmits data to be transmitted to the first apparatus to the data transfer unit on the basis of the data transfer unit address received during replacement. The data transfer unit then transfers data received from the third apparatus to the second apparatus, such as, an authentication server.

The communication controller may be further provided with an apparatus detection unit. The apparatus detection unit monitors data transmitted on the computer network, detects at least the addresses of the third apparatus and the data transfer unit, and stores the addresses into a storage device corresponding to the apparatus detection unit. Then, the address replacement unit performs replacement on the basis of the addresses of the third apparatus and the data transfer unit in the storage device corresponding to the apparatus detection unit.

In the communication controller, when the third apparatus is connected to the computer network, the address replacement unit may transmit an instruction to the second apparatus, for replacing the address of the third apparatus in a storage device corresponding to the second apparatus with the address of the data transfer unit after the second apparatus stores the address of the third apparatus into the corresponding storage device. The second apparatus may transmit data to be transmitted to the third apparatus, to the data transfer unit on the basis of the address after the replacement.

The network described above may include a router, and the communication controller may be connected with the second apparatus via the router. The third apparatus may be connected to the second apparatus via the router. The following is also possible. When the third apparatus is connected to the computer network, the router stores the address of the third apparatus into a corresponding storage device, the address replacement unit transmits an instruction to the router for replacing the address of the third apparatus in the storage device corresponding to the router with the address of the data transfer unit and the router transmits data to be transmitted originally to the third apparatus, to the data transfer unit.

Furthermore, the first to third apparatuses and the communication controller may transmit and receive data in accordance with the TCP/IP protocol. Each of the address of the first apparatus and the address of the data transfer unit includes an IP address and a Media Access Control (MAC) address, and the address replacement unit may replace the MAC address between the two addresses of the first apparatus, with the MAC address of the data transfer unit. The address replacement unit may perform the replacement of the MAC addresses in accordance with the Address Resolution Protocol (ARP).

Furthermore, the second apparatus may hold predetermined apparatus authentication criteria and have function of deciding whether or not the first apparatus satisfies the apparatus authentication criteria. The second apparatus may be a "sorry" server.

Furthermore, the present invention provides a communication control method and apparatus in a computer network which is connected to at least first and second apparatuses and to which a third apparatus is further connectable, the third apparatus storing at least the address of the first apparatus in a corresponding storage device and performing transmission and receipt of data to and from the first apparatus on the basis of the stored address. In the communication control method and apparatus: (1) the address replacement unit transmits an instruction to the third apparatus for replacing the address of the first apparatus stored in the storage device corresponding to the third apparatus with the address of the data transfer unit when the third apparatus is connected to the computer network; (2) the third apparatus transmits data to be originally transmitted to the first apparatus, to the data transfer unit on the basis of the address after the replacement; and (3) the data transfer unit transmits the data received from the third apparatus to the second apparatus.

Other characteristics and features of the present invention will be apparent from the description in Best Mode for Carrying Out the Invention below.

DETAILED DESCRIPTION OF THE DRAWINGS

Figure 1:
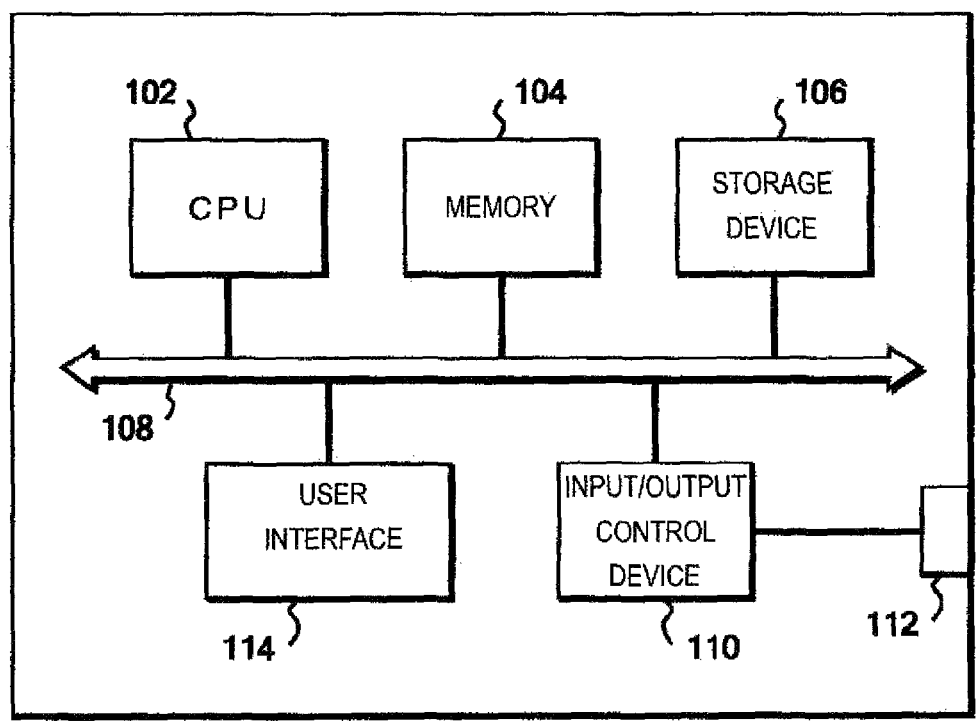
FIG. 1 is an overall system view of a hardware arrangement embodying a communication controller 100 in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Portions of the program code may execute on the user's computer or terminal, partly on the user's computer or terminal as a stand-alone software package, partly on the user's computer and partly on remote computers or servers or all on remote computers or servers. In the latter scenarios, the remote computers may be connected to the user's computer through any type of network, including a local area network (LAN) or a wide area network (WAN), or the connection may be made to an external computer (for example, through the Internet using an Internet Service Provider).

Aspects of the present invention are described below with reference to system and flowchart illustrations and/or block diagrams of methods, apparatus (systems) and computer program products according to embodiments of the invention. It will be understood that each block of the flowchart illustration, and combinations of blocks in the flowchart illustrations, can be implemented by computer program instructions. These computer program instructions may be provided to a processor of a general purpose computer, special purpose computer, or other programmable data processing apparatus to produce a machine or system, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or system, other programmable data processing apparatus, or other devices, such as, storage devices, user terminals, or remote computers such as, servers, to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices, to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The systems and flowchart block diagrams in FIGS. 1 to 10, illustrate the architecture, functionality, and operation of possible implementations of systems, methods and computer program products according to various embodiments of the present invention. In this regard, blocks in the system and flowchart block diagrams may represent or embody a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the system and flowchart illustration, and combinations of blocks in the system and flowchart illustration, can be implemented by special purpose hardware-based systems that perform the specified functions or acts, or combinations of special purpose hardware and computer instructions.

EXPLANATION OF TERMS

As an aid to understanding the general scope of the invention, but not to be taken as limiting, the following terms, as used through this specification and claims, may be described as follows:

Apparatus: All devices that can be connected to a network are included. For example, a server computer, a portable computer, a display, a storage device, an office machine such as a fax machine and a copying machine, a printer, and the like are included. An apparatus may be a virtual apparatus realized by computer software or may refer to a program code arrangement or a group of program code arrangements existing on a computer memory.

Connection: A state in which an apparatus is enabled to perform information communication via a network is expressed as "connected", being distinguished from "connectable" which includes both of an unconnected state and a connected state. The phrase "when connected" means "in the connected state" and may include "being connected at a particular time on a time series" or "being connected during a particular time width". However, it is not limited to these meanings.

Communication controller: The communication controller may include, at least, an address replacement unit and a data transfer unit. These units may be physically distributed and arranged on a network. These units may be implemented in one arrangement to also include an optional apparatus detection unit.

Address: The term refers to the identification number of an apparatus connected to a network. Both single identification numbers and a set of multiple identification numbers corresponding to multiple protocols are included. For example, such a set may be the set of an IP address and MAC address.

Corresponding storage device: A storage device corresponding to an apparatus is a storage device which the apparatus can access to record or retrieve information, and the type and the implementation place thereof is not limited.

Data: The term is used in a general meaning as used in the industry. Of course, a data packet transmitted on a network is also included.

Replacement: The term is used in a general meaning used in the industry. Various realization methods are conceivable, such as erasing an original address and newly writing a new address, and overwriting an original address with a new address.

In the description below, it is assumed that a network and various apparatuses connected thereto perform data communication in accordance with the TCP/IP protocol. However, the communication protocol is not limited thereto as far as each operation of this invention is realized.

Hardware Configuration

FIG. 1 is an overall system view of a hardware configuration for embodying a communication controller 100, in accordance with the present invention.

The communication controller 100 comprises a CPU 102, a memory 104, a storage device 106, an input/output control device 110, a user interface 114, a bus 108 connecting the same and a communication port 112 to the network. The code of a communication control program may be stored in the storage device 106, or it may be introduced into the memory 104 via the communication port 112 and the input/output control device 110. The communication control program code may be loaded into memory 104 and executed by CPU 102, or it may be executed by CPU 102 as it is still stored in storage device 106. The memory 104 may be used as a temporary storage memory for any of a variety of purposes. The user interface 11 is used to display the operation state of the communication controller 100 and/or as an input terminal for providing operation control.

The communication control program code can be divided into multiple parts and recorded in multiple storage media. For example, divided portions of the control program code may be stored in storage media in other information processing apparatuses connected to the communication controller 100 via communication port 112 and a computer network (not shown) connected thereto. In such an arrangement, CPU 102 may cause portions of the divided code to be executed in cooperation with one another. To distribute divided code to multiple apparatus and cause the code to cooperate with one another may be embodied, for example, in a client/server system. Which portions of the code each apparatus should execute and which function each apparatus should realize may be appropriately selected when such system is designed. The present invention contemplates any of a variety of such forms.

The communication controller 100 of FIG. 1 may be configured so that it is physically separated into units of functional blocks as described below. Where such is the case, hardware, similar to that shown in FIG. 1, is arranged for each functional block, and the functional blocks cooperate with one another via their communication ports akin to communication port 112 in FIG. 1.

Each of the components described above is shown as an example, and all the components are not necessarily indispensable components of the present invention. Though an operating system which operates to control the communication controller is not indispensable, an operating system which supports a graphic user interface multi-window environment as a standard capability, such as Windows®, XP®, AIX®, Linux®, or other operating systems, such as µITRON, are possible. The present invention is not limited to a particular operating system environment.

System Configuration

Next, the functional block diagram of the operation of the communication controller 100 will be described with reference to FIG. 2. The functional blocks shown in FIG. 2 may be realized by the hardware illustrated in FIG. 1. However, each of them is a logical functional block, and it is not necessarily meant that each of them is realized by discrete hardware or software. Each of the functional blocks may be embodied by a separate independent piece of hardware or by the cooperation of pieces of hardware, or by common hardware or software. As for an address, it is assumed that, when the units are realized by separate pieces of hardware that cooperate with one another via a network, each unit has an inherent address. Where all the units are included in the same apparatus and cooperate with one another, the address of each unit refers to the address of the apparatus.

In a preferable embodiment of the present invention, the communication controller 100 includes an input/output control unit 202, an address replacement unit 204 (also called a packet guiding unit), a data transfer unit 206 (also called a redirector), an apparatus detection unit 208 (also called a sensor) and an address management unit 210. The input/output control unit 202 appropriately transmits incoming data from an external network to the address replacement unit 204, the data transfer unit 206 and the apparatus detection unit 208, and sends out data from these units to an external network. The input/output control unit 202 may be implemented, for example, as a network interface card (NIC). Typically, it is desirable that the input/output control unit 202 is connected to a normal port or a mirror port of a switch, or a network tap (a data tapping device for sending communication data flowing on a network to various kinds of apparatus), but the input/output control unit 202 is not limited to such function.

The address replacement unit 204 preferably rewrites a part of contents stored in ARP caches of other apparatus via a network, with the use of address resolution protocol (ARP). The ARP is a protocol used to determine an Ethernet® physical address (a MAC address) from an IP address in a TCP/IP network, and it mainly includes an ARP request and an ARP response.

When a particular apparatus connected to a network needs to acquire the MAC address of another apparatus, it broadcasts an ARP request including the IP address of the other apparatus, into the network. The other apparatus having the IP address includes its own MAC address into an ARP response and unicasts the ARP response. In this way, apparatus in the network can acquire the MAC address of other apparatus.

The address replacement unit 204 operates to include a predetermined MAC address into an ARP response and transmits it to the requesting source via the input/output control unit 202. The MAC address may be inputted by the user of communication controller 100 via the user interface 114.

Figures 2, 3:
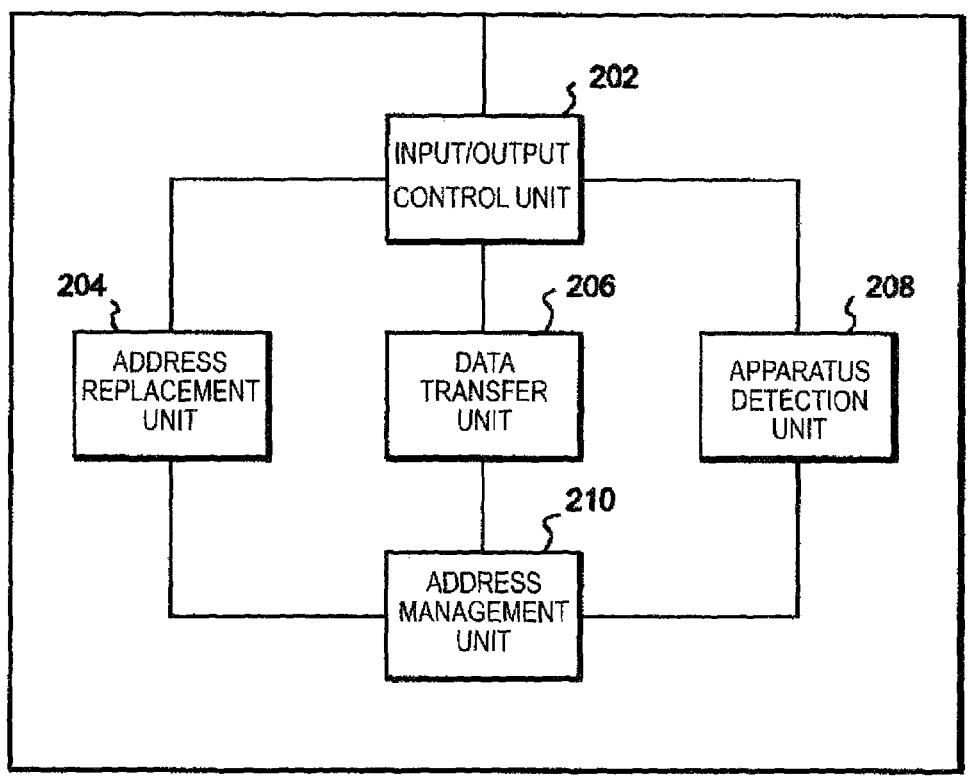
FIG. 2 is a functional block diagram of the communication controller 100 of the present invention.
FIG. 3 is a conceptual diagram of an address table 300 held by the address management unit 210 in FIG. 2.

FIG. 3 is a conceptual diagram of an address table 300 held by the address management unit 210 of FIG. 2 and is provided as an aid to understanding the operation of the address management unit. This conceptual diagram does not necessarily mean that the address management unit 210 collectively manages the addresses at one place in the form of the address table 300. The storage place and the storage form of the data is not limited as far as the manner and location from which address management unit 210 may access the address data.

The address management unit 210 operates on addresses, such as the examples represented by address table 300, which representation includes addresses of other apparatus connected to the network and its own address. The address table 300 may further be accessed by the address replacement unit 204, the data transfer unit 206 and the apparatus detection unit 208 of FIG. 2. The address management unit 210 acquires the information in cooperation with the apparatus detection unit 208. The details of operation are described below.

The operation of data transfer unit 206 of FIG. 2 will be described with reference to the process depicted in FIG. 4. Data transfer unit 206 of FIG. 2 receives a packet, as shown by step 402, via the input/output control unit 202. Where the source address of the received packet is the address of an apparatus registered in advance, the destination address of the packet is inquired, as represented by step 406.

Here, the apparatus registered in advance may be an authentication server. The authentication server may include computers or computer programs having, for example, the function of monitoring the use form of a network system and deciding whether the use form conforms with the operation policy of the network. The authentication server may also be such that it acts to check whether an apparatus to be newly connected to the network conforms with the network operation policy, and permits connection of the apparatus to the network only when the apparatus conforms with the network operation policy.

Alternatively, the apparatus registered in advance may be, for example, a "sorry server". The sorry server is a server which responds in the event that services of an application server are not available for some reason. Such may be the case where the application server is unavailable because of overload, maintenance, repair or the like. For example, the sorry server may respond with a message to the request source indicating that "maintenance being carried out for the application server".

Figure 4:
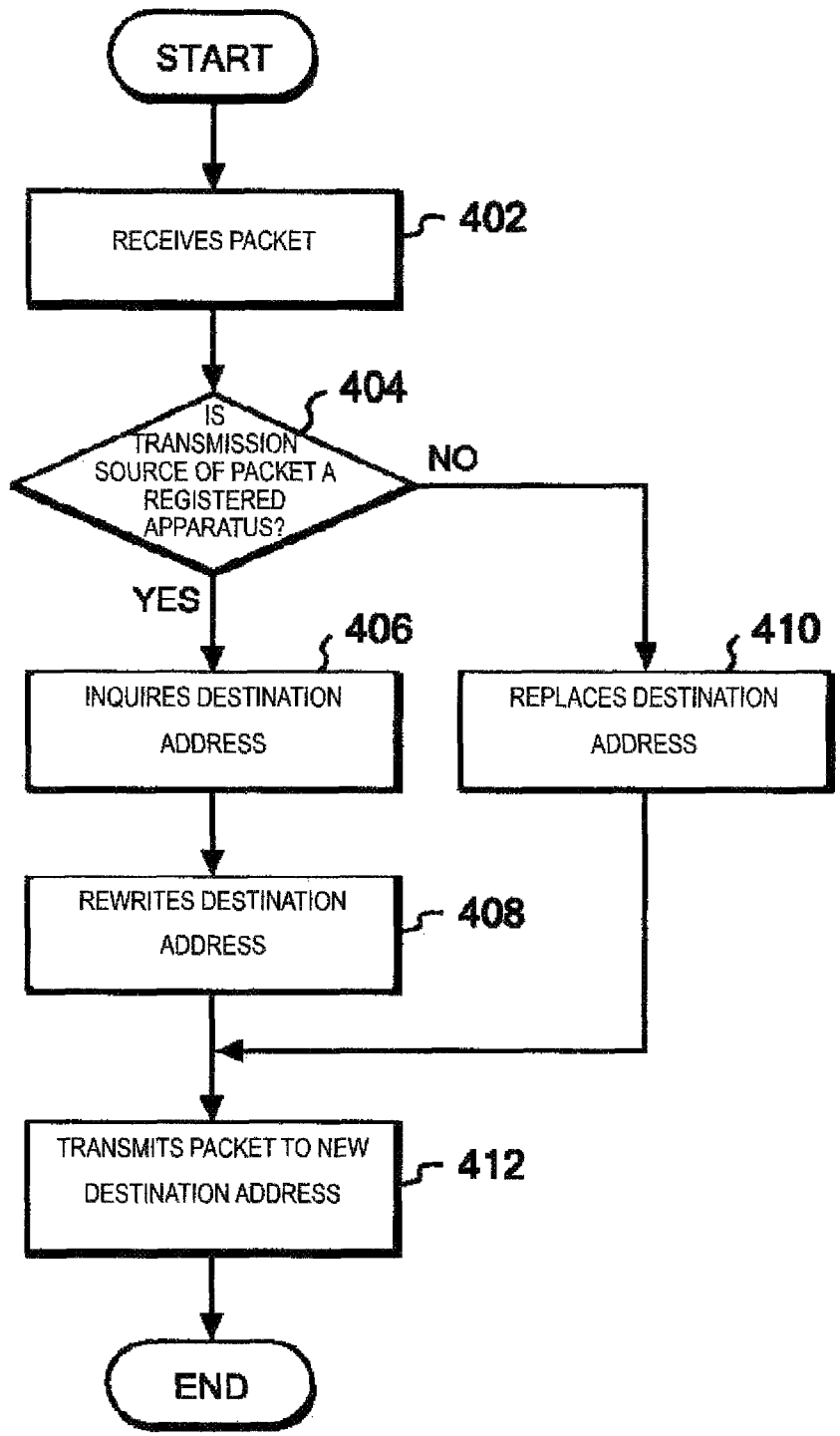
FIG. 4 is a flowchart of the process carried out by the data transfer unit 206 in FIG. 2.

The description that follows operates on the assumption that the apparatus registered in advance, as depicted by "yes" in block 404 of FIG. 4, is an authentication server. However, the apparatus is not limited to an authentication server. This registration may be performed by a user entering the registration at user interface 114, as shown in FIG. 1, or by data transfer unit 206 receiving registration input from an external apparatus via the input/output control unit 202.

At step 406 of FIG. 4, the data transfer unit 206 of FIG. 2 refers to the address table 300 depicted in FIG. 3 which is managed by the address management unit 210. The data transfer unit acquires the MAC address of the destination address on the basis of the destination IP address of the packet.

Data transfer unit 206 further rewrites the original destination address with the MAC address acquired from the address table 300 as well as the received IP address as a new destination address of the packet as shown in step 408 of FIG. 4. Then, data transfer unit 206 transmits the packet including the new destination address to the network via input/output control unit 202, as shown in FIG. 2.

On the other hand, if the source of the packet is not an apparatus registered in advance at step 404, the data transfer unit 206 replaces the destination address of the packet with the destination address of an apparatus registered in advance (step 410). For example, the data transfer unit 206 replaces the destination IP address and MAC address of the packet with the destination IP address and MAC address of an authentication server registered in advance. In addition to these addresses, a destination port number (in the case of TCP/UDP) or a destination address in application data may be replaced as necessary.

Here, the application data is data included in the packet. A destination address is also included in it. In the case where the destination address is used on the server side to provide services, it is preferable that the destination address in the application data is changed at the same time. When the address replacement ends, the data transfer unit 206 transmits the packet to the network via the input/output control unit 202.

Next the function of the apparatus detection unit 208 (sensor) of FIG. 2 will be described with reference to FIG. 5. The apparatus detection unit 208 acts to set the operation mode of the input/output control unit 202 to a promiscuous mode (step 502) of FIG. 5. The promiscuous mode is widely known in the industry as one of the operation modes of NIC, and it is a mode for receiving and reading all packets flowing on the network. Thus, in this mode, input/output control unit 202 transmits all received packets to the apparatus detection unit 208, as shown by step 504 in FIG. 5. Next, apparatus detection unit 208 acquires addresses included in the received packets as shown by step 506 in FIG. 5. Then, the addresses are stored in the address table 300 managed by address management unit 210. As described above, typically, pairs of IP address and MAC address are stored in the address table 300, but it is clear that what is stored is not limited thereto.

Figure 5:
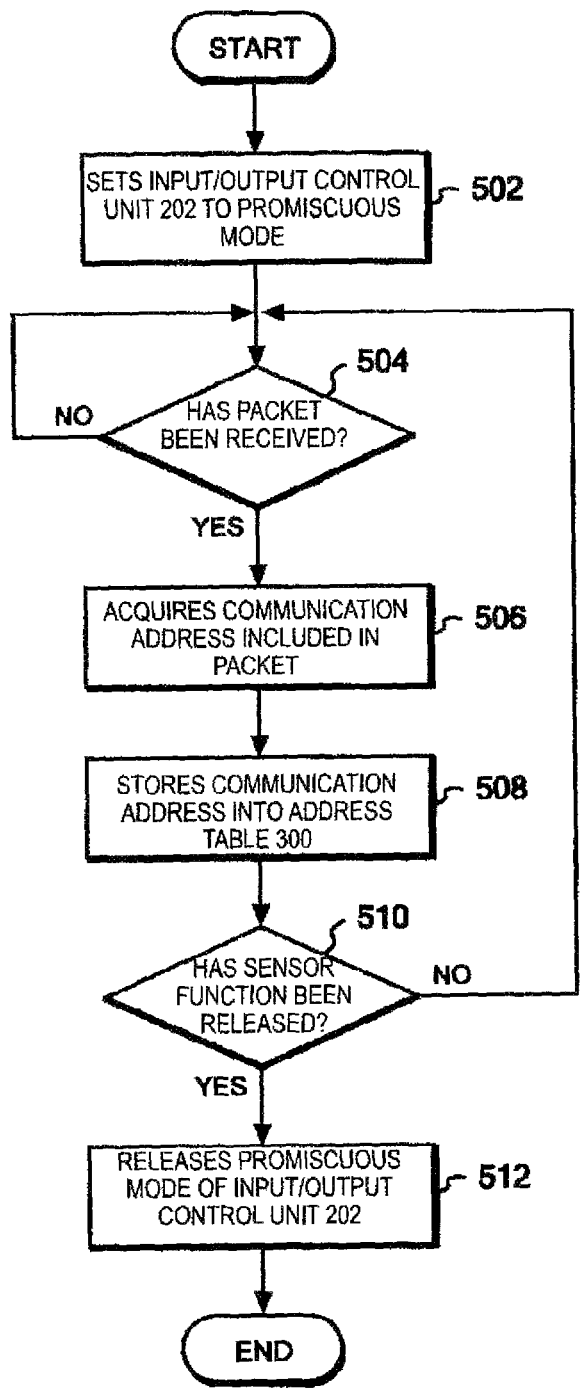
FIG. 5 is a flowchart of the process carried out by the apparatus detection unit 208 in FIG. 2.

The above operation continues until the function of the apparatus detection unit 208 is released, as shown by step 510 in FIG. 5. It is preferable that the above operation be continued and the addresses of all the apparatus existing in the same segment on the network to which the communication controller 100 belongs to be stored in the address table 300. However, it is sufficient that the addresses of a part of the apparatus of such network segment are stored insofar as the operation to be described is concerned. Thus, it is not necessary that the addresses of all the apparatus be stored.

When the operation or function of the apparatus detection unit 208 is released (or canceled), the promiscuous mode of apparatus detection unit 208 is released, as shown in step 512 of FIG. 5. The release (cancellation) may be based on any trigger, for example, a lapse of a predetermined time, an input from the user, an instruction from another apparatus, and the like.

Network Operation

The details of the operation of the communication controller 100 is as described above. As an aid to understanding the overall operation of Controller 100, reference is now made to FIGS. 6 and 8.

Figure 6:
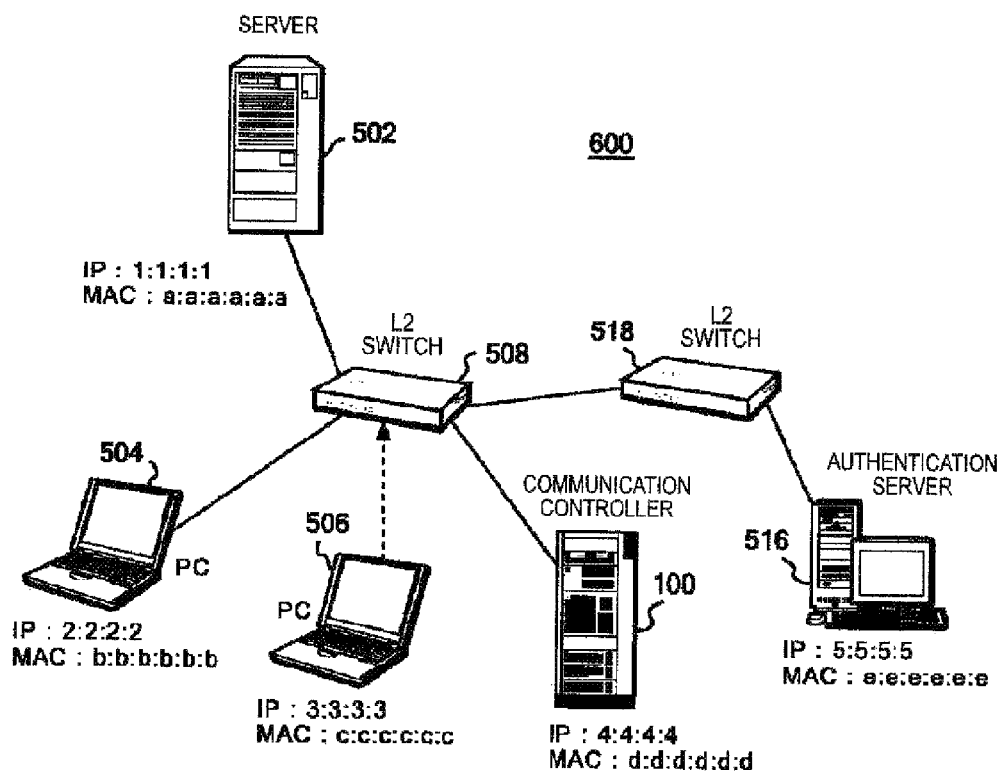
FIG. 6 is a configuration diagram of a computer network 600 to which the communication controller 100 may be connected.
Figure 8:
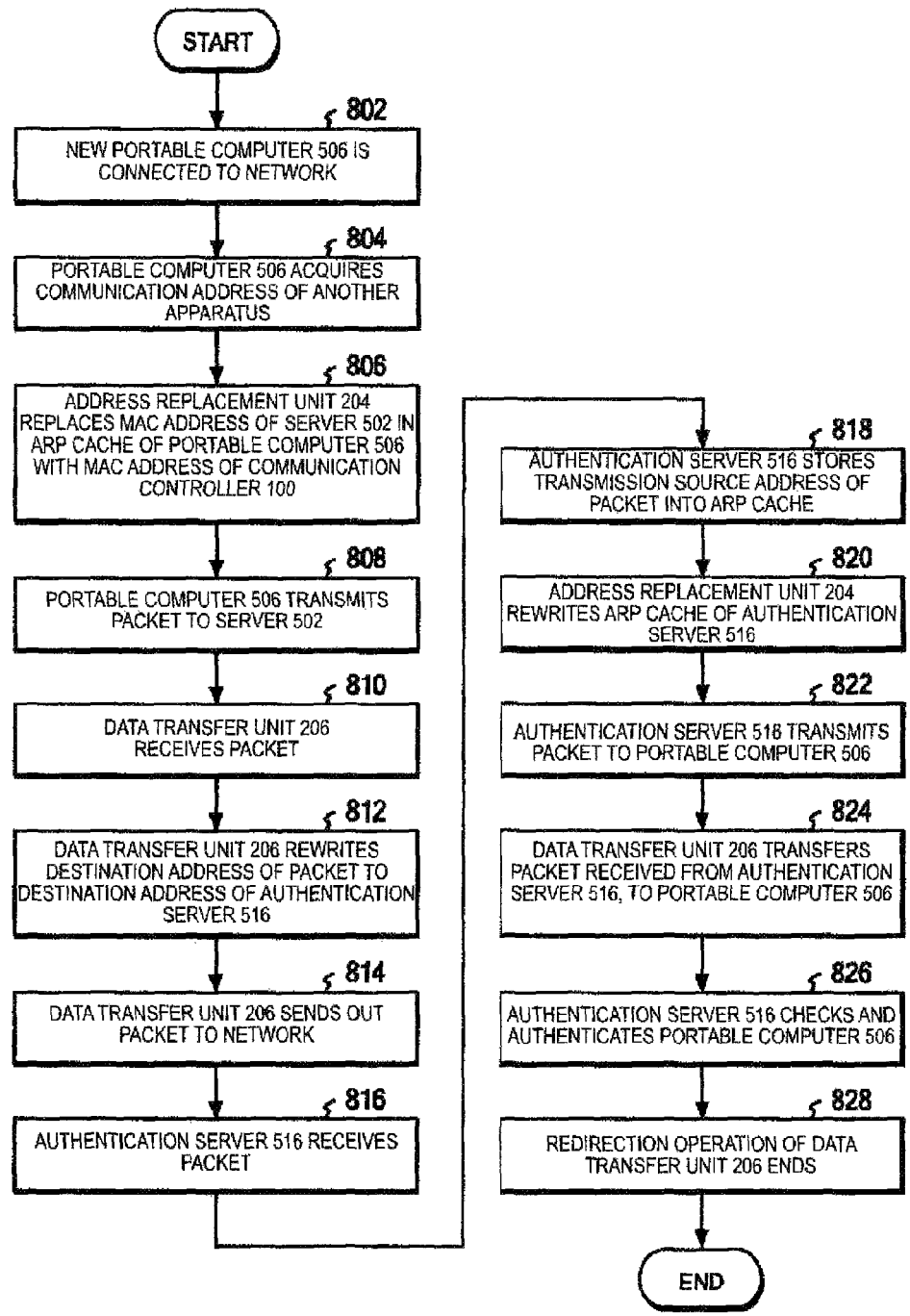
FIG. 8 is a flowchart showing the operation of each apparatus in the computer network, including the operating procedure of the communication controller 100.

FIG. 6 shows an example of a network 600 to which the communication controller 100 may be connected. FIG. 8 shows the operating procedure of each apparatus in the network. The network 600 includes a server 502, a portable computer 504 and an authentication server 516. These apparatus are connected to one another via layer 2 switches (L2 switches) 508 and 518. All apparatus included in network 600 belong to the same segment (a continuous area which can be accessed at a time on the network).

The communication controller 100, as shown in the configuration of FIG. 6, may be connected to such a network 600, but the network to which controller 100 may be connected is not limited thereto. In embodiment of FIG. 6, the communication controller 100 is connected to the network 600 so that it may perform data communication with other apparatuses via the L2 switch 508. Other configurations are possible.

When a connectable terminal, such as, portable computer 506 is newly connected to network 600, it starts communication with the server 502, as shown by step 802 in FIG. 8. It is assumed at this point, that portable computer 506 has already acquired the IP address of server 502 in an appropriate well-known method. It is preferable that portable computer 506 also acquires the MAC address of server 502 to communicate with the server 502.

The portable computer 506 broadcasts the IP address of server 502, 1.1.1.1 to all apparatus in the network segment in accordance with the ARP to request transmission of their MAC addresses. In response to this request, server 502 returns its MAC address a:a:a:a:a:a (FIG. 3) to portable computer 506 in the form of an ARP response. The returned IP address 1.1.1.1 and MAC address a:a:a:a:a:a of server 502 is stored in an ARP cache, which is the storage area of the portable computer 506, and the addresses are subsequently used by the portable computer 506 as the address of the server 502 (step 804) of FIG. 8.

At this point, the address replacement unit 204 of the communication controller 100 replaces the MAC address (a:a:a:a:a:a) of the server 502 in the ARP cache of portable computer 506 with the MAC address of data transfer unit 206 in communication controller 100, as predetermined in advance (in this example, the MAC address of the communication controller 100, d:d:d:d:d:d). This is shown in step 806 of FIG. 8.

The replacement timing can be adjusted appropriately. It is preferable; however, that the replacement be performed after portable computer 506 receives the ARP response from server 502 but before the portable computer 506 transmits data to server 502 next time.

The following operations are also possible. The apparatus detection unit 208 in FIG. 2 always updates the address table 300 at predetermined time intervals, and within a predetermined time after an unknown apparatus (the portable computer 506 in this example) is detected. In addition, immediately after an ARP return is performed with the unknown apparatus as the destination, the address replacement unit 204 may replace the address in the ARP cache of the portable computer 506.

Thus, it can be seen that, as a result of the above processing, the address of server 502 held by the portable computer 506 is replaced with (IP: 1.1.1.1, MAC: d:d:d:d:d:d) (step 806). Accordingly, when portable computer 506 in FIG. 6 transmits a packet to server 502 next time, in accordance with the TCP/IP protocol, (step 808), the packet is transmitted to the communication controller 100.

The data transfer unit 206 of Communication Controller 100 receives the packet (step 810), and in accordance with the procedure described with reference to FIG. 4, it rewrites the destination address of the packet to the address (IP: 5.5.5.5., MAC: e:e:e:e:e:e) of the authentication server registered in advance (step 812) and sends out the packet to the network again (step 814).

The packet sent out to the network reaches authentication server 516 shown in FIG. 6 via the L2 switches 508 and 518 in a well-known operation (step 816) of FIG. 8. The authentication server 516, which has received the packet, stores the source address (IP: 3.3.3.3., MAC c:c:c:c:c:c) of the packet into its own ARP cache (step 818).

After that, the address replacement unit 204 rewrites the MAC address (c:c:c:c:c:c) of the portable computer 506 in the ARP cache of the authentication server 516 to the MAC address (d:d:d:d:d:d) of communication controller 100, similarly to the method for rewriting the ARP cache of the portable computer 506 described above (step 820). In this way the packet transmitted to portable computer 506 from the authentication server 516 (step 822) is transmitted to the data transfer unit 206 in the communication controller 100.

As described above with reference to FIG. 4 (steps 408 and 412), the data transfer unit 206 rewrites the destination address of the incoming packet from the authentication server 516 to the address of the portable computer 506 and transmits the packet to the portable computer 506.

According to the operation described above, the packet transmitted to the server 502 from the portable computer 506 is transmitted to the authentication server 516, which is registered with the data transfer unit 206 of the communication controller 100 in advance, via the communication controller 100 (step 824).

A packet transmitted to the portable computer 506 from the authentication server 516 is also handled via the data transfer unit 206 of the communication controller 100.

The authentication server 516 then judges, for example, whether or not the portable computer 506 conforms with a network operation policy (including a network security policy) predetermined in advance.

For example, the network operation policy may include the following: the portable computers 504 and 506 should be such that (1) a password is set for the screen saver, (2) input of a password is requested at activation of the hard disk drive, and (3) a predetermined firewall is installed and is effective, (4) predetermined virus detection software operates at a specified time.

As described above, the portable computer 506 newly connected to the network 600 is forced to be connected to the authentication server 516 to allow a predetermined quarantine/authentication process by the controller 100 (step 826).

It is preferable that the packet redirection operation by the data transfer unit 206 is terminated when the authentication by the authentication server 516 is completed. For example, the following is possible. The authentication server 516 notifies the address replacement unit 204 that authentication is complete, and the address replacement unit 204 replaces the address of the server 502 in the ARP cache of the portable computer 506 with the original address, that is, (IP: 1.1.1.1., MAC: a:a:a:a:a:a). Replacement may be performed after a predetermined time after packet redirection starts. Alternatively, the authentication server 516 may directly access the ARP cache of the portable computer 506 (step 828) of FIG. 8.

Further Embodiment

Figure 7:
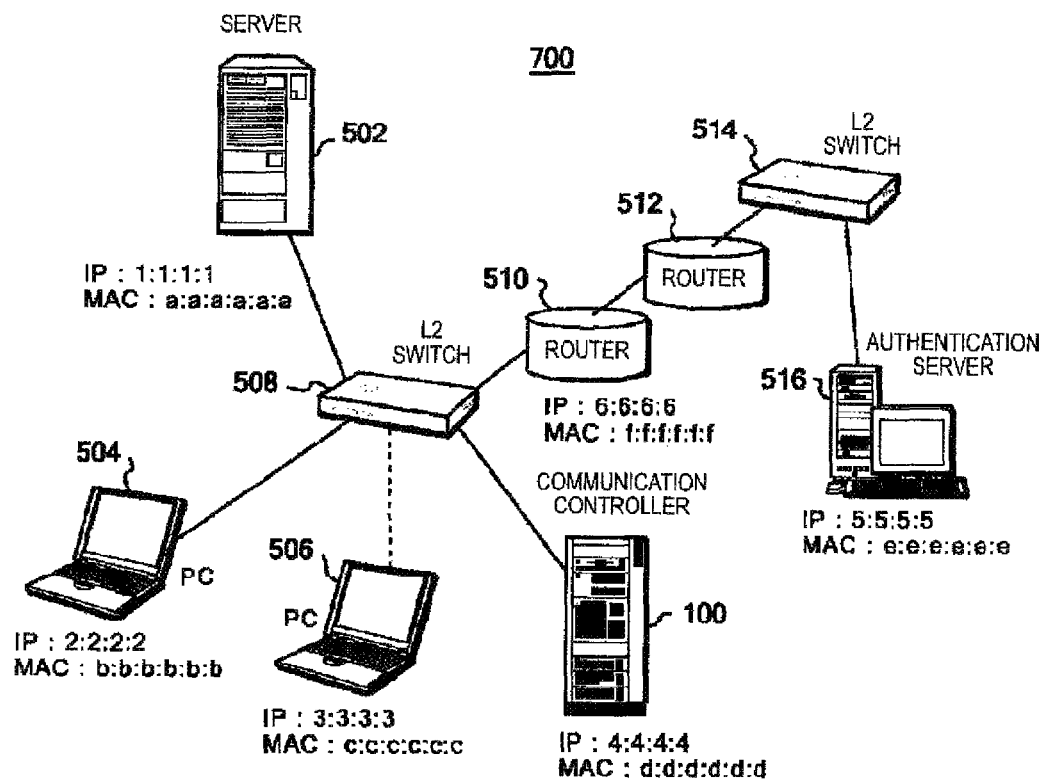
FIG. 7 is a configuration diagram of another computer network 700 to which the communication controller 100 may be connected.

FIG. 7 shows an example of another computer network configuration 700. The difference between network 600 shown in FIG. 6 and network 700 is that routers 510 and 512 are added in network 700. Thus, in the computer network 700, the server 502 is connected to the personal computer 504 and the communication controller 100 via the L2 switch 508 to form one segment. On the other hand, authentication server 516 is connected to an L2 switch 514 and belongs to a different segment. As shown in FIG. 7, these different segments are mutually connected via the routers 510 and 512.

In the network configuration of FIG. 7, the address replacement unit 204, as shown in FIG. 2, rewrites the MAC address (c:c:c:c:c:c) of the portable computer 506 in the ARP cache of router 510 to the MAC address (d:d:d:d:d:d) of the communication controller 100. Thus, when a packet is sent by the authentication server 516 to portable computer 506, the packet is sent via communication controller 100.

Yet a Further Embodiment

In the above embodiments, a return packet from the authentication server 516 to the portable computer 506 is via the communication controller 100 by the address replacement unit 204 rewriting the ARP cache of the authentication server 516 or the router 510.

Figure 9:
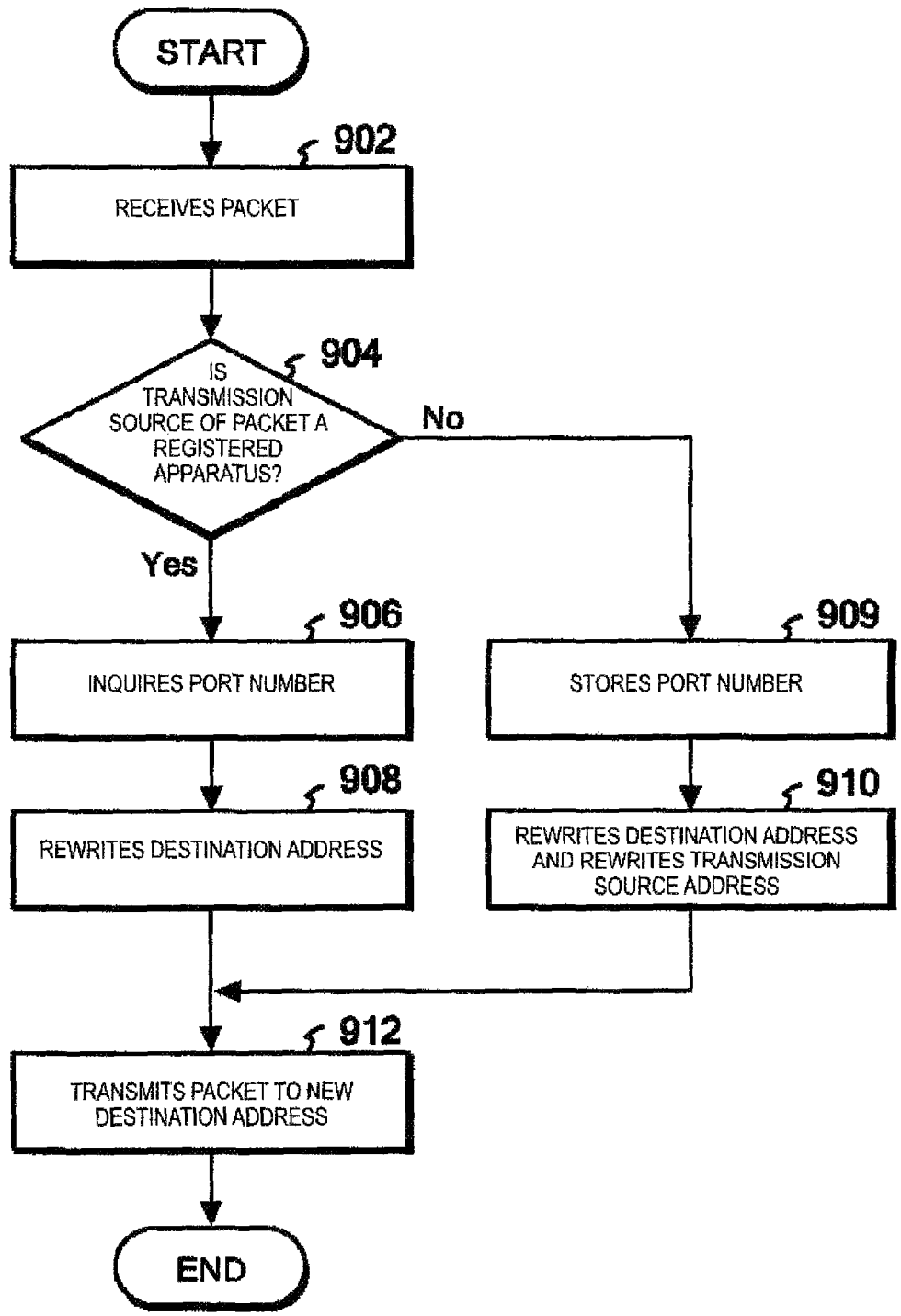
FIG. 9 is a flowchart of processing by the data transfer unit 206 according to another embodiment.

In a different method, when transferring a packet received from the portable computer 506 to the authentication server 516, data transfer unit 206 in communication controller 100 may convert a source address in the packet to its own address. As a result, the operation of rewriting the ARP cache of the authentication server 516 or the router 510 may be omitted. FIG. 9 shows the outline of the operation of the data transfer unit 206 in accordance with this different method.

Figure 10:
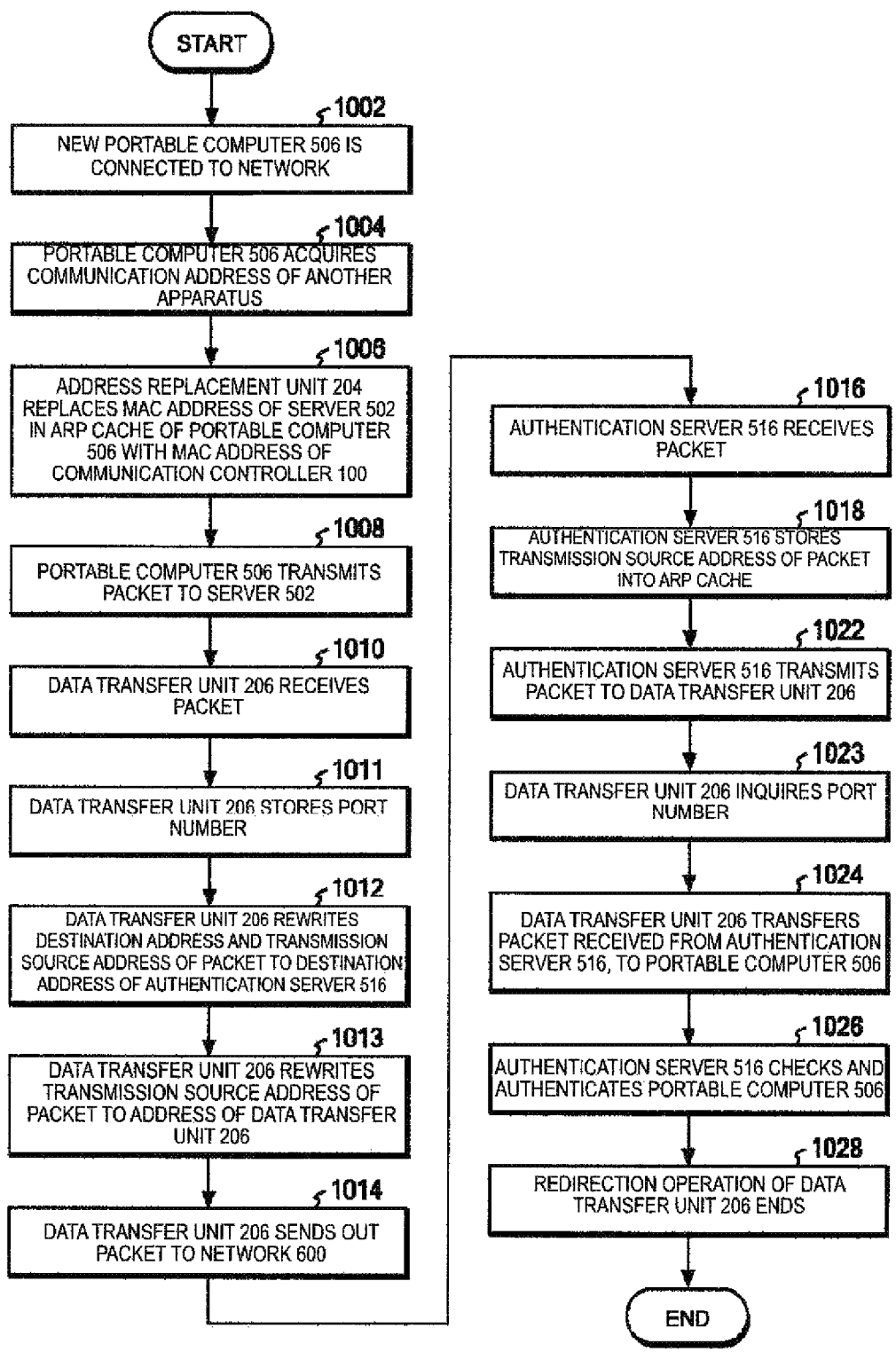
FIG. 10 is a flowchart showing the operation of each apparatus in the computer network, including the operating procedure of the communication controller 100, according to the another embodiment of FIG. 9.

FIG. 10 is a flowchart showing the operational procedure of each apparatus in the computer network, including the operation procedure of the communication controller 100, according to the above different method. First, the function of the data transfer unit 206 in accordance with the different method will be described with reference to FIG. 9. The data transfer unit 206 receives a packet via the input/output control unit 202 (step 902). If the source address of the received packet is the address of an apparatus registered in advance (step 904), the destination address of the packet is searched for in an extended address table managed by the address management unit 210, with a port number included in the packet as a key (step 906). The details of the extended address table, such as table 300 extended, will be described later. Where the apparatus is registered in advance, the registration method, as shown by steps 908 and 912, is the same as described with reference to FIG. 4.

At step 906, the data transfer unit 206 of FIG. 2 rewrites the original destination address, with the searched-out destination address as a new destination address of the packet (step 908). Then, the data transfer unit 206 transmits the packet including the new destination address, to the network via the input/output control unit 202 (step 912).

Where the source address of the received packet is not a device registered in advance, the data transfer unit 206 sends a port number included in the packet to the address management unit 210. The address management unit 210 stores the source address and that of the port number into address table 300 in association with each other (at step 909). In this way, the address table 300 is extended so as to include the relation between the port number in the packet and the source of the packet. The data transfer unit 206 also changes the destination address of the packet to the destination address of a device registered in advance (at step 910). The details of the address changing is as described in FIG. 4. Furthermore, the data transfer unit 206 changes the source address of the packet to its own address (at step 910).

The data transfer unit 206 sends the packet to the network via the input/output control unit 202, after the address changing is completed (at step 912).

FIG. 10 shows work flow in accordance with the different method. The different method is applicable to, for example, both of the network 600 shown in FIG. 6 and the network 700 shown in FIG. 7. However, this method is not limited to the above network configurations.

For purposes of description, it is assumed that the portable computer 506 is newly connected to network 600 and starts communication with the server 502 (at the step 1002). Then, the packet receiving process of the data transfer unit 206 from the portable computer 506 is carried out in the same manner as described with reference to FIG. 8.

When the packet is received by the data transfer unit 206 (at the step 1010), the port number included in that packet is transferred from the data transfer unit 206 to the address management unit 210 as described with referenced to FIG. 9. The address management unit 210 stores the port number and the source address (IP: 3.3.3.3, MAC: c:c:c:c:c:c) into the address table 300 in association with each other (at the step 1011).

Then, the data transfer unit 206 rewrites the destination address of the packet to the address (IP: 5.5.5.5, MAC: e:e:e: e:e:e) of the authentication server registered in advance (step 1012). In addition, the data transfer unit 206 rewrites the source address of the packet to its own address (IP: 4.4.4.4, MAC: d:d:d:d:d:d) (step 1012). When rewriting of the destination address and source address of the packet ends, the data transfer unit 206 sends out the packet to the network 600 (step 1014).

The packet sent out to the network, as shown in FIG. 6, reaches the authentication server 516 via the L2 switches 508 and 518 in a well-known procedure (step 1016). The authentication server 516 which has received the packet, stores the source address, that is, the address (IP: 4.4.4.4, MAC: d:d:d: d:d:d) of data transfer unit 206 into its own ARP cache (step 1018). Accordingly, a return packet from authentication server 516 in response to the packet which the authentication server 516 has received from the portable computer 506 via the data transfer unit 206 is, in turn, transmitted to data transfer unit 206 in the communication controller 100 (step 1022).

As described with reference to FIG. 9, data transfer unit 206 searches the address table 300 managed by the address management unit 210 for the destination address of the packet, with the port number included in the incoming packet from the authentication server 516 acting as a key (step (906). Then, the data transfer unit 206 rewrites the original destination address, with the searched-out destination address (IP: 3.3.3.3, MAC: c:c:c:c:c:c) as a new destination address of the packet (step 908) and transmits the packet to portable computer 506 (step 912).

According to the operation described above, the packet transmitted to the server 502 from the portable computer 506 is transmitted to the authentication server 516, which is registered with the data transfer unit 206 of the communication controller 100 in advance, via the communication controller 100.

A packet transmitted to the portable computer 506 from the authentication server 516 is also transmitted via the data transfer unit 206 of the communication controller 100. Next authentication server 516 evaluates, for example, whether or not the portable computer 506 conforms with a network operation policy (including a network security policy) predetermined in advance.

As described above, it can be seen that the portable computer 506 newly connected to the network 600 is forced by the controller 100 to be connected to the authentication server 516 to undergo a predetermined quarantine/authentication process (step 1026). The operation after authentication by the authentication server 516 is completed as described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. The term "apparatus" includes single and multiple forms of apparatus. It will be further understood that the terms "comprises" and/or "comprising", when used in this specification, specify the presence of stated features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A communication controller connectable to a computer network comprising:
    at least first, second and third apparatus connectable to said computer network;
    wherein the third apparatus is operative to store at least the address of the first apparatus in a storage device corresponding to the third apparatus and capable of performing transmission and receipt of data to and from the first apparatus on the basis of the stored address;
    the communication controller including a processor and memory, and further comprising;
    an address replacement unit;
    a data transfer unit; and
    an input/output control unit connected to the address replacement unit and the data transfer unit to transmit data from the network to the address replacement unit and data transfer unit when the third apparatus establishes communication with the first apparatus through the computer network to enable the address replacement unit to transmit an instruction to the third apparatus for replacing the address of the first apparatus stored in the storage device corresponding to the third apparatus with the address of the data transfer unit so that when the third apparatus transmits data to be transmitted to the first apparatus, the data is transmitted to the data transfer unit and the data transfer unit then acts to transfer the data to the second apparatus, wherein the second apparatus comprises any of an authentication server, sorry sever or other designated sever or a registration apparatus.

2. The communication controller according to claim 1, further comprising an apparatus detection unit for monitoring data transmitted on the computer network and detecting at least the addresses of the third apparatus and the data transfer unit and storing the addresses in a storage device corresponding to the apparatus detection unit with the apparatus detection unit acting to allow the address replacement unit to perform address replacement on the basis of the addresses of the third apparatus and the data transfer unit in the storage device corresponding to the apparatus detection unit.

3. The communication controller according to claim 1, wherein
    when the third apparatus is connected to the computer network, the second apparatus stores the address of the third apparatus into a corresponding storage device;
    the address replacement unit transmits an instruction to the second apparatus for replacing the address of the third apparatus in the storage device corresponding to the second apparatus with the address of the data transfer unit; and
    the second apparatus transmits data to be transmitted to the third apparatus to the data transfer unit on the basis of the address of the replacement.

4. The communication controller according to claim 1, wherein
    the network further includes a router;
    the communication controller is connected to the second apparatus via the router;

the third apparatus is connectable to the second apparatus via the router, such that when the third apparatus is connected to the computer network, the router stores the address of the third apparatus in a corresponding storage device, the address replacement unit transmits an instruction to the router for replacing the address of the third apparatus in the storage device corresponding to the router with the address of the data transfer unit, and the router transmits data to be transmitted to the third apparatus, to the data transfer unit.

5. The communication controller according to claim 1, wherein
the first, second and third apparatus and the communication controller transmit and receive data in accordance with the TCP/IP protocol;
the address of at least the first apparatus and the address of the data transfer unit includes an IP address and a Media Access Control (MAC) address; and
the address replacement unit acts to replace the MAC address of the first apparatus in the MAC address table of the third apparatus with the MAC address of the data transfer unit.

6. The communication controller according to claim 5, wherein the address replacement unit performs the replacement of the MAC addresses in accordance with the Address Resolution Protocol (ARP).

7. The communication controller according to claim 1, wherein the second apparatus stores predetermined network apparatus authentication criteria and operates to decide whether or not the first apparatus satisfies the apparatus authentication criteria.

8. The communication controller according to claim 5, wherein the MAC address of the first apparatus in the MAC address table of the third apparatus is replaced with the address of the MAC address of the data transfer unit before the third apparatus responds to the communication by the first apparatus of its MAC address to the third apparatus.

9. A communication control method for a computer network comprising the steps of:
transmitting to a third apparatus when the third apparatus establishes communication with a first apparatus through the computer network an address replacement instruction for replacing the address of the first apparatus stored in a storage device corresponding to the third apparatus with the address of a data transfer unit;
transmitting data from the third apparatus, to be transmitted to the first apparatus, to the data transfer unit on the basis of the address after the address replacement;
transferring data received by the data transfer unit from the third apparatus to a second apparatus; and
wherein said computer network is connectable to at least said first, second and third apparatus; wherein the third apparatus capable of storing at least the address of the first apparatus in a corresponding storage device and performing transmission and receipt of data to and from the first apparatus on the basis of the stored address and said second apparatus comprises any of an authentication server, sorry server or other designated server, or a registration apparatus.

10. The communication control method according to claim 9, further comprising:
monitoring data transmitted over the computer network and detecting at least the addresses of the third apparatus and the data transfer unit;
storing at least the addresses of the third apparatus and the data transfer unit in a storage device; and
replacing the address of the first apparatus stored in the storage device corresponding to the third apparatus with the address of the data transfer unit as stored in the storage device.

11. The communication control method according to claim 9, further comprising:
storing the address of the third apparatus into a storage device corresponding the second apparatus when the third apparatus is connected to the computer network;
transmitting an instruction to the second apparatus for replacing the address of the third apparatus in the storage device corresponding to the second apparatus with the address of the data transfer unit; and
transmitting data to be transmitted to the third apparatus from the second apparatus, to the data transfer unit on the basis of the address after the replacement.

12. The communication control method according to claim 9, wherein the computer network further includes a router, and the third apparatus is connectable to the second apparatus via the router, the communication control method further comprising:
storing the address of the third apparatus into a device storage corresponding to the router when the third apparatus is connected to the computer network;
transmitting an instruction for replacing the address of the third apparatus in the storage device corresponding to the router with the address of the data transfer unit; and
transferring data to be transmitted to the third apparatus via the router, to the data transfer unit.

13. The communication control method according to claim 9, wherein
the first to third apparatus transmit and receive data in accordance with the TCP/IP protocol;
each of the address of the first apparatus and the address of the data transfer unit includes an IP address and a MAC address; and
transmitting an instruction for replacing the MAC address of the first apparatus in the MAC address table of the third apparatus with the MAC address of the data transfer unit.

14. The communication control method according to claim 13 wherein the step of replacing the replaces the MAC addresses is carried out in accordance with the Address Resolution Protocol (ARP).

15. The communication control method according to claim 9, further comprising the step deciding whether or not the third apparatus satisfies predetermined apparatus authentication criteria in response to communication with the third apparatus.

16. A computer program product for controlling apparatus connection in a computer network, comprising:
a non-transitory computer readable storage medium having computer readable program code embodied therewith, the computer readable program code comprising:
computer readable program code configured to cause transmission to a third apparatus when the third apparatus establishes communication with a first apparatus through the computer network an address replacement instruction for replacing the address of the first apparatus stored in the storage device corresponding to the third apparatus with the address of a data transfer unit;
computer readable program code configured to allow data to be transmitted by the third apparatus to the first apparatus to be transmitted to the data transfer unit on the basis of the address after the address replacement; and computer readable program code configured to cause the data received by the data transfer unit from the third apparatus to be transferred to a second apparatus;

wherein said third apparatus is connectable to at least said first and second apparatus through said network; wherein said third apparatus capable of storing at least the address of the first apparatus in a corresponding storage device and capable of performing transmission and receipt of data to and from the first apparatus on the basis of the stored address and; said second apparatus comprises any of an authentication server, sorry server or other designated server, or a registration device, the computer program product causing a network computer to operate as an address replacement unit and a data transfer unit.

17. The computer program product according to claim 16, further comprising:

computer readable code configured to cause the monitoring of data transmitted over the computer network and detecting at least the addresses of the third apparatus and the data transfer unit;

computer readable program code configured to cause the storing of at least the addresses of the third apparatus and the data transfer unit in a storage device; and computer readable program code configured to cause the replacing of the address of the third apparatus with the address of the data transfer unit as stored in the storage device.

18. The computer program product according to claim 16, further comprising:

computer readable program code configured to cause the storing of the address of the third apparatus into a storage device corresponding the second apparatus when the third apparatus is connected to the computer network;

computer readable program code configured to cause the transmission of an instruction to the second apparatus for replacing the address of the third apparatus in the storage device corresponding to the second apparatus with the address of the data transfer unit; and computer readable program code configured to cause the transmission of data to be transmitted to the third apparatus from the second apparatus, to the data transfer unit on the basis of the address after the replacement.

19. The computer program product according to claim 16, wherein the computer network further includes a router, and the third apparatus is connectable to the second apparatus via the router:

computer readable program code configured to cause the storing of the address of the third apparatus into a storage device corresponding to the router when the third apparatus is connected to the computer network;

computer readable program code configured to cause the transfer of an instruction for replacing the address of the third apparatus in the storage device corresponding to the router with the address of the data transfer unit; and computer readable program code configured to cause the transfer of data from the second apparatus to the third apparatus to be transferred to the data transfer unit.

20. The computer program product to claim 16, wherein:

the first, second and third apparatus transmit and receive data in accordance with the TCP/IP protocol;

each of the addresses of the first, second and third apparatus and the address of the data transfer unit includes an IP address and a MAC address; and computer readable program code configured to cause the replacing of the MAC address of the first apparatus in the MAC address table of the third apparatus with the MAC address of the data transfer unit.

21. The computer program product according to claim 20 wherein the computer readable program code for replacing the MAC address replaces the MAC addresses in accordance with the Address Resolution Protocol (ARP).

22. The computer program product according to claim 16, further comprising computer readable program code for deciding whether or not the third apparatus satisfies predetermined apparatus authentication criteria in response to communication with the second apparatus.

23. A network arrangement comprising:

at least first and second computer apparatus connected to the network;

at least a third apparatus connectable to the network;

a communication controller acting to control connection of said third apparatus to the network when said third apparatus initiates connection to the first apparatus through the network, said communication controller including a processor and memory comprising:

an address replacement unit and a data transfer unit wherein when said third apparatus initiates connection to the first apparatus and the first apparatus responds to the third apparatus, the address replacement unit acts to replace the address of the first apparatus stored in the storage device for the third apparatus with the address of the data transfer unit so that when said third apparatus transmits data to be transmitted to the first apparatus, the transmitted data is transferred to the data transfer unit and the data transfer unit transfers the transmitted data to the second apparatus wherein the second apparatus stores the address of said third apparatus in its associated storage device, wherein the second apparatus comprises any of an authentication server, sorry server or other designated server or a registration apparatus.

24. The computer network arrangement of claim 23, wherein the address replacement unit operates to transmit an instruction to the second apparatus that acts to replace the address of the third apparatus stored in the storage device of the second apparatus with the address of the data transfer unit so that when said second apparatus transmits data to the third apparatus, the data is transmitted to the data transfer unit which then transfers the data to the third apparatus.

25. The computer network arrangement of claim 24 wherein said second apparatus acts to authenticate the third apparatus according to network authentication criteria.

* * * * *